United States Patent
Gravina (10) Patent No.: US 10,823,083 B2
(45) Date of Patent: Nov. 3, 2020

(54) GEARBOX FOR A GAS TURBINE ENGINE

(71) Applicant: GE AVIO S.R.L, Rivalta di Torino (IT)

(72) Inventor: Michele Gravina, Barletta-Andria-Trani (IT)

(73) Assignee: GE Avio S.r.l., Rivalta di Torino (IT)

( * ) Notice: Subject to any disclaimer, the term of this patent is extended or adjusted under 35 U.S.C. 154(b) by 86 days.

(21) Appl. No.: 16/163,927

(22) Filed: Oct. 18, 2018

(65) Prior Publication Data

US 2019/0112985 A1   Apr. 18, 2019

(30) Foreign Application Priority Data

Oct. 18, 2017 (EP) ..................................... 17425101

(51) Int. Cl.
  *F16H 57/04* (2010.01)
  *F02C 7/36* (2006.01)
  (Continued)

(52) U.S. Cl.
  CPC ................ *F02C 7/36* (2013.01); *F02C 3/113* (2013.01); *F02C 7/06* (2013.01); *F02K 3/06* (2013.01); *F16H 57/046* (2013.01); *F16H 57/0479* (2013.01); *F16H 57/0486* (2013.01); *F16H 57/082* (2013.01); *F05D 2220/36* (2013.01);
  (Continued)

(58) Field of Classification Search
  None
  See application file for complete search history.

(56) References Cited

U.S. PATENT DOCUMENTS

| | | | |
|---|---|---|---|
| 2,951,631 A | * | 9/1960 | Gregory .................. F04D 25/02 415/191 |
| 3,074,688 A | | 1/1963 | De Muth et al. |

(Continued)

FOREIGN PATENT DOCUMENTS

| | | |
|---|---|---|
| EP | 2518296 A2 | 10/2012 |
| EP | 2559914 A1 | 2/2013 |

(Continued)

OTHER PUBLICATIONS

EP Search Report and Written Opinion dated Apr. 9, 2018 which was issued in connection with EP patent application No. 17425102.5 which was filed on Oct. 18, 2017.

(Continued)

*Primary Examiner* — Justin Holmes
(74) *Attorney, Agent, or Firm* — Dority & Manning, P.A.

(57) ABSTRACT

An epicyclic gearbox includes a sun gear assembly, a planet gear assembly, and a ring gear assembly engaged with a forward planet gear and an aft planet gear of the planet gear assembly. A first axial shroud is also provided positioned forward of the forward planet gear or aft of the aft planet gear along an axial direction. The first axial shroud covers substantially all of a forward side of the forward planet gear or an aft side of the aft planet gear. The planet gear assembly is coupled to a planet gear carrier, the planet gear carrier including a radial shroud including one or more radial shroud surfaces extending along at least a portion of an outer circumference of the forward planet gear and along at least a portion of an outer circumference of the aft planet gear.

20 Claims, 9 Drawing Sheets (51) Int. Cl.
*F02K 3/06* (2006.01)
*F16H 57/08* (2006.01)
*F02C 3/113* (2006.01)
*F02C 7/06* (2006.01)
*F16H 1/28* (2006.01)

(52) U.S. Cl.
CPC ............... *F05D 2260/40311* (2013.01); *F05D 2260/98* (2013.01); *F16H 2001/289* (2013.01)

(56) References Cited

U.S. PATENT DOCUMENTS

| | | | |
|---|---|---|---|
| 3,160,026 | A | 12/1964 | Rosen |
| 3,490,746 | A * | 1/1970 | Bell .......................... F02C 7/18 415/177 |
| 3,502,177 | A | 3/1970 | Christie |
| 4,429,587 | A | 2/1984 | Finn, III et al. |
| 5,048,370 | A | 9/1991 | Duello |
| 6,223,616 | B1 | 5/2001 | Sheridan |
| 6,446,755 | B1 | 9/2002 | Varailhon et al. |
| 6,666,300 | B2 | 12/2003 | Varailhon et al. |
| 6,996,968 | B2 | 2/2006 | Peters et al. |
| 7,377,110 | B2 * | 5/2008 | Sheridan ................ B01D 45/14 60/39.08 |
| 7,491,149 | B2 | 2/2009 | Greenwood et al. |
| 8,128,524 | B2 | 3/2012 | Lasko et al. |
| 8,753,243 | B2 | 6/2014 | McCune et al. |
| 8,794,107 | B2 | 8/2014 | Rollins |
| 8,820,478 | B2 | 9/2014 | Gauthier et al. |
| 8,900,090 | B2 | 12/2014 | Sheridan |
| 8,939,714 | B1 | 1/2015 | McCune et al. |
| 9,103,413 | B2 | 8/2015 | Curti et al. |
| 9,404,381 | B2 | 8/2016 | NguyenLoc et al. |
| 9,470,303 | B2 | 10/2016 | McPeak et al. |
| 2008/0006018 | A1 | 1/2008 | Sheridan et al. |
| 2010/0317477 | A1 | 12/2010 | Sheridan et al. |
| 2013/0023378 | A1 | 1/2013 | McCune et al. |
| 2013/0102432 | A1 * | 4/2013 | Imai .................... F16H 57/0409 475/159 |
| 2014/0064930 | A1 | 3/2014 | Sheridan et al. |
| 2014/0309078 | A1 | 10/2014 | Curti et al. |
| 2015/0267802 | A1 | 9/2015 | Sheridan et al. |
| 2015/0345321 | A1 | 12/2015 | McCune et al. |
| 2016/0131243 | A1 | 5/2016 | Fomison |
| 2016/0326906 | A1 | 11/2016 | Sheridan et al. |
| 2016/0348781 | A1 | 12/2016 | Slayter et al. |
| 2016/0377165 | A1 | 12/2016 | Sheridan |
| 2017/0254407 | A1 | 9/2017 | Cipolla et al. |

FOREIGN PATENT DOCUMENTS

| | | |
|---|---|---|
| EP | 2518296 A2 | 4/2018 |
| WO | 2014099087 A2 | 6/2014 |
| WO | 2014099087 A3 | 6/2014 |
| WO | 2014152347 A2 | 9/2014 |
| WO | 2014152347 A3 | 9/2014 |
| WO | 2015147948 A2 | 10/2015 |
| WO | 2015147948 A3 | 10/2015 |
| WO | 2017022213 A1 | 2/2017 |
| WO | 2017022214 A1 | 2/2017 |

OTHER PUBLICATIONS

EP Search Report and Written Opinion dated Apr. 23, 2018 which was issued in connection with EP patent application No. 17425101.7 which was filed on Oct. 18, 2017.

* cited by examiner

GEARBOX FOR A GAS TURBINE ENGINE

FIELD

The present subject matter relates generally to a gearbox for a gas turbine engine, or more particularly, a gearbox for a gas turbine engine having various shrouds to minimize windage losses and increase efficiency.

BACKGROUND

A gas turbine engine generally includes a fan and a core arranged in flow communication with one another with the core disposed downstream of the fan in the direction of the flow through the gas turbine. The core of the gas turbine engine generally includes, in serial flow order, a compressor section, a combustion section, a turbine section, and an exhaust section. With multi-shaft gas turbine engines, the compressor section can include a high pressure compressor (HP compressor) disposed downstream of a low pressure compressor (LP compressor), and the turbine section can similarly include a low pressure turbine (LP turbine) disposed downstream of a high pressure turbine (HP turbine). With such a configuration, the HP compressor is coupled with the HP turbine via a high pressure shaft (HP shaft), and the LP compressor is coupled with the LP turbine via a low pressure shaft (LP shaft).

In operation, at least a portion of air over the fan is provided to an inlet of the core. Such portion of the air is progressively compressed by the LP compressor and then by the HP compressor until the compressed air reaches the combustion section. Fuel is mixed with the compressed air and burned within the combustion section to provide combustion gases. The combustion gases are routed from the combustion section through the HP turbine and then through the LP turbine. The flow of combustion gasses through the turbine section drives the HP turbine and the LP turbine, each of which in turn drives a respective one of the HP compressor and the LP compressor via the HP shaft and the LP shaft. The combustion gases are then routed through the exhaust section, e.g., to atmosphere.

The LP turbine drives the LP shaft, which drives the LP compressor. In addition to driving the LP compressor, the LP shaft can drive the fan through a power gearbox, which allows the fan to be rotated at fewer revolutions per unit of time than the rotational speed of the LP shaft for greater efficiency. The power gearbox typically includes a sun gear, one or more planet gears, and a ring gear. Lubrication fluid is provided to one or more of these gears and associated bearings during operation to cool down the gearbox, to increase its efficiency and to reduce wear. However, for such a gearbox, the lubrication fluid and an air-oil mist in a gearbox cavity may generate windage losses and may reduce an efficiency of the gearbox and its component parts. Accordingly, a power gearbox having one or more features for modifying a motion of the lubrication fluid in desired locations would be useful.

BRIEF DESCRIPTION

Aspects and advantages of the invention will be set forth in part in the following description, or may be apparent from the description, or may be learned through practice of the invention.

In one exemplary embodiment of the present disclosure, an epicyclic gearbox is provided defining an axial direction, a radial direction, and a circumferential direction. The epicyclic gearbox includes a sun gear assembly and a planet gear assembly. The planet gear assembly includes a forward planet gear and an aft planet gear spaced along the axial direction, the forward planet gear and aft planet gear each engaged with the sun gear assembly, the forward planet gear defining an outer circumference and the aft planet gear defining an outer circumference. The epicyclic gearbox further includes a ring gear assembly engaged with the forward planet gear and the aft planet gear and a first axial shroud positioned forward of the forward planet gear or aft of the aft planet gear along the axial direction. The first axial shroud covers substantially all of a forward side of the forward planet gear or an aft side of the aft planet gear to contain lubrication fluid within or around the planet gear assembly. The epicyclic gearbox also includes a planet gear carrier, the planet gear assembly coupled to the planet gear carrier, the planet gear carrier including a radial shroud including one or more radial shroud surfaces extending along at least a portion of the outer circumference of the forward planet gear and along at least a portion of the outer circumference of the aft planet gear to contain lubrication fluid within or around the planet gear assembly.

In certain exemplary embodiments the sun gear assembly includes a forward sun gear and an aft sun gear spaced along the axial direction, wherein the forward planet gear is engaged with the forward sun gear, and wherein the aft planet gear is engaged with the aft sun gear.

In certain exemplary embodiments the first axial shroud is a forward axial shroud positioned forward of the forward planet gear along the axial direction and covering substantially all of the forward side of the forward planet gear.

For example, in certain exemplary embodiments, the epicyclic gearbox further includes a second, aft axial shroud positioned aft of the aft planet gear along the axial direction and covering substantially all of the aft side of the aft planet gear.

For example, in certain exemplary embodiments the forward axial shroud is coupled to the aft axial shroud.

For example, in certain exemplary embodiments, the epicyclic gearbox further includes a lubrication spray ring including a plurality of lubrication spray bars spaced along the circumferential direction, wherein the forward axial shroud is coupled to the aft axial shroud through the plurality of lubrication spray bars of the lubrication spray ring.

For example, in certain exemplary embodiments the forward axial shroud defines an axial separation from the forward planet gear less than about 0.5 inches, and wherein the aft axial shroud defines an axial separation from the aft planet gear less than about 0.5 inches.

In certain exemplary embodiments the one or more radial shroud surfaces of the radial shroud extend along at least about 20 percent of the outer circumference of the forward planet gear and of the outer circumference of the aft planet gear.

In certain exemplary embodiments the epicyclic gearbox further includes a lubrication spray ring including a plurality of lubrication spray bars spaced along the circumferential direction, wherein the plurality of lubrication spray bars includes a first lubrication spray bar and a second lubrication spray bar, wherein the first lubrication spray bar and the second lubrication spray bar are each positioned adjacent to the forward planet gear and the aft planet gear, wherein the first lubrication spray bar includes a radial shroud surface, wherein the second lubrication spray bar also includes a radial shroud surface, wherein the one or more radial shroud surfaces of the radial shroud of the planet gear carrier and the radial shroud surfaces of the first and second spray bars together extend along at least about seventy percent of the outer circumferences of the forward planet gear and of the aft planet gear.

For example, in certain exemplary embodiments the one or more radial shroud surfaces of the radial shroud of the planet gear carrier and the radial shroud surfaces of the first and second spray bars together extend along at least about eighty percent of the outer circumferences of the forward planet gear and of the aft planet gear.

For example, in certain exemplary embodiments the one or more radial shroud surfaces of the radial shroud of the planet gear carrier and the radial shroud surfaces of the first and second spray bars together define an average separation with the forward planet gear and the aft planet gear of less than about 0.7 inches.

In certain exemplary embodiments the forward planet gear is a first forward planet gear of a plurality of forward planet gears, wherein the aft planet gear is a first aft planet gear of a plurality of aft planet gears, wherein each of the plurality of forward planet gears is engaged with the sun gear assembly and the ring gear assembly, wherein each of the plurality of aft planet gears is also engaged with the sun gear assembly and the ring gear assembly, and wherein the first axial shroud is a forward axial shroud positioned forward of the plurality of forward planet gears along the axial direction, covering substantially all of a forward side of each of the plurality of forward planet gears.

For example, in certain exemplary embodiments, the epicyclic gearbox further includes a second, aft axial shroud positioned aft of the plurality of aft planet gears along the axial direction and covering substantially all of an aft side of each of the plurality of aft planet gears.

In another exemplary embodiment of the present disclosure, a gas turbine engine defining an axial direction is provided. The gas turbine engine includes a turbine section For example, in certain exemplary embodiments a turbine; a fan assembly including a fan; and a epicyclic gearbox coupling the turbine of the turbine section to the fan of the fan assembly. The epicyclic gearbox includes a sun gear assembly and a planet gear assembly, the planet gear assembly including a forward planet gear and an aft planet gear spaced along the axial direction, the forward planet gear and aft planet gear each engaged with the sun gear assembly, the forward planet gear defining an outer circumference and the aft planet gear defining an outer circumference. The epicyclic gearbox further includes a ring gear assembly engaged with the forward planet gear and the aft planet gear, and a first axial shroud positioned forward of the forward planet gear or aft of the aft planet gear along the axial direction, the first axial shroud covering substantially all of a forward side of the forward planet gear or an aft side of the aft planet gear to contain lubrication fluid within or around the planet gear assembly. The epicyclic gearbox further includes a planet gear carrier, the planet gear assembly coupled to the planet gear carrier, the planet gear carrier including a radial shroud including one or more radial shroud surfaces extending along at least a portion of the outer circumference of the forward planet gear and along at least a portion of the outer circumference of the aft planet gear to contain lubrication fluid within or around the planet gear assembly.

In certain exemplary embodiments the sun gear assembly includes a forward sun gear and an aft sun gear spaced along the axial direction, wherein the forward planet gear is engaged with the forward sun gear, and wherein the aft planet gear is engaged with the aft sun gear.

In certain exemplary embodiments the first axial shroud is a forward axial shroud positioned forward of the forward planet gear along the axial direction and covering substantially all of the forward side of the forward planet gear.

For example, in certain exemplary embodiments the epicyclic gearbox further includes a second, aft axial shroud positioned aft of the aft planet gear along the axial direction and covering substantially all of the aft side of the aft planet gear.

For example, in certain exemplary embodiments the forward axial shroud defines an axial separation from the forward planet gear less than about 0.5 inches, and wherein the aft axial shroud defines an axial separation from the aft planet gear less than about 0.5 inches.

In certain exemplary embodiments the one or more radial shroud surfaces of the radial shroud extend along at least about 20 percent of the outer circumference of the forward planet gear and of the outer circumference of the aft planet gear.

In certain exemplary embodiments the epicyclic gearbox further includes a lubrication spray ring including a plurality of lubrication spray bars spaced along the circumferential direction, wherein the plurality of lubrication spray bars includes a first lubrication spray bar and a second lubrication spray bar, wherein the first lubrication spray bar and the second lubrication spray bar are each positioned adjacent to the forward planet gear and the aft planet gear, wherein the first lubrication spray bar includes a radial shroud surface, wherein the second lubrication spray bar also includes a radial shroud surface, wherein the one or more radial shroud surfaces of the radial shroud of the planet gear carrier and the radial shroud surfaces of the first and second spray bars together extend along at least about seventy percent of the outer circumferences of the forward planet gear and of the aft planet gear.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components.

The terms "forward" and "aft" refer to relative positions within a gas turbine engine or a component of a gas turbine engine, and refer to the normal operational attitude of the gas turbine engine or component. For example, with regard to a gas turbine engine, forward refers to a position closer to an engine inlet and aft refers to a position closer to an engine nozzle or exhaust.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Figure 1:
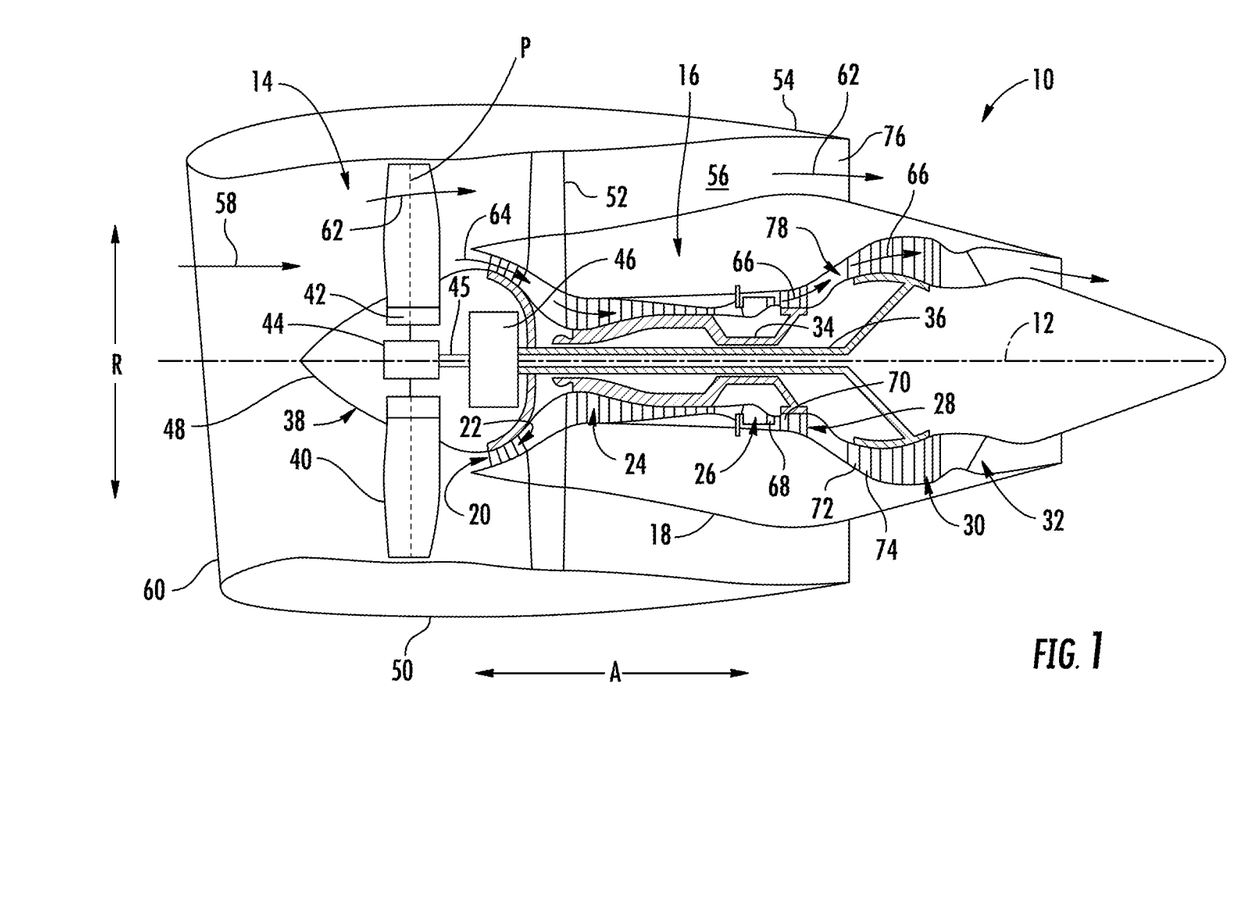
FIG. 1 is a schematic cross-sectional view of an exemplary gas turbine engine according to various embodiments of the present disclosure.

Referring now to the drawings, wherein identical numerals indicate the same elements throughout the drawings, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R that is normal to the axial direction A. In general, the turbofan engine 10 includes a fan section 14 and a core turbine engine 16 disposed downstream from the fan section 14.

The exemplary core turbine engine 16 depicted generally includes a substantially tubular outer casing 18 that defines an annular inlet 20. As schematically shown in FIG. 1, the outer casing 18 encases, in serial flow relationship, a compressor section including a booster or low pressure (LP) compressor 22 followed downstream by a high pressure (HP) compressor 24; a combustion section 26; a turbine section including a high pressure (HP) turbine 28 followed downstream by a low pressure (LP) turbine 30; and a jet exhaust nozzle section 32. A high pressure (HP) shaft or spool 34 drivingly connects the HP turbine 28 to the HP compressor 24 to rotate them in unison. A low pressure (LP) shaft or spool 36 drivingly connects the LP turbine 30 to the LP compressor 22 to rotate them in unison. The compressor section, combustion section 26, turbine section, and nozzle section 32 together define a core air flowpath.

For the embodiment depicted in FIG. 1, the fan section 14 includes a variable pitch fan 38 having a plurality of fan blades 40 coupled to a disk 42 in a spaced apart manner. As depicted in FIG. 1, the fan blades 40 extend outwardly from the disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal axis 12 via a fan shaft 45 that is powered by the LP shaft 36 across a power gear box 46. The power gear box 46 includes a plurality of gears for adjusting the rotational speed of the fan shaft 45 and thus the fan 38 relative to the LP shaft 36 to a more efficient rotational fan speed.

Referring still to the exemplary embodiment of FIG. 1, the disk 42 is covered by a rotatable front hub 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that the nacelle 50 is supported relative to the core turbine engine 16 by a plurality of circumferentially-spaced outlet guide vanes 52. Moreover, a downstream section 54 of the nacelle 50 extends over an outer portion of the core turbine engine 16 so as to define a bypass airflow passage 56 therebetween.

During operation of the turbofan engine 10, a volume of air 58 enters the turbofan engine 10 through an associated inlet 60 of the nacelle 50 and/or fan section 14. As the volume of air 58 passes across the fan blades 40, a first portion of the air 58 as indicated by arrow 62 is directed or routed into the bypass airflow passage 56, and a second portion of the air 58 as indicated by arrow 64 is directed or routed into the upstream section of the core air flowpath, or more specifically into the inlet 20 of the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where the highly pressurized air is mixed with fuel and burned to provide combustion gases 66.

The combustion gases 66 are routed into and expand through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed into and expand through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and rotation of the fan 38 via the power gearbox 46.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan engine 10, also providing propulsive thrust. The HP turbine 28, the LP turbine 30, and the jet exhaust nozzle section 32 at least partially define a hot gas path 78 for routing the combustion gases 66 through the core turbine engine 16.

It should be appreciated, however, that the exemplary turbofan engine 10 depicted in FIG. 1 is by way of example only, and that in other exemplary embodiments, the turbofan engine 10 may have any other suitable configuration. For example, in other exemplary embodiments, the fan 38 may be configured in any other suitable manner (e.g., as a fixed pitch fan) and further may be supported using any other suitable fan frame configuration. Moreover, it also should be appreciated that in other exemplary embodiments, any other suitable LP compressor 22 configuration may be utilized. It also should be appreciated, that in still other exemplary embodiments, aspects of the present disclosure may be incorporated into any other suitable gas turbine engine. For example, in other exemplary embodiments, aspects of the present disclosure may be incorporated into, e.g., a turboshaft engine, turboprop engine, turbocore engine, turbojet engine, etc.

Figure 2:
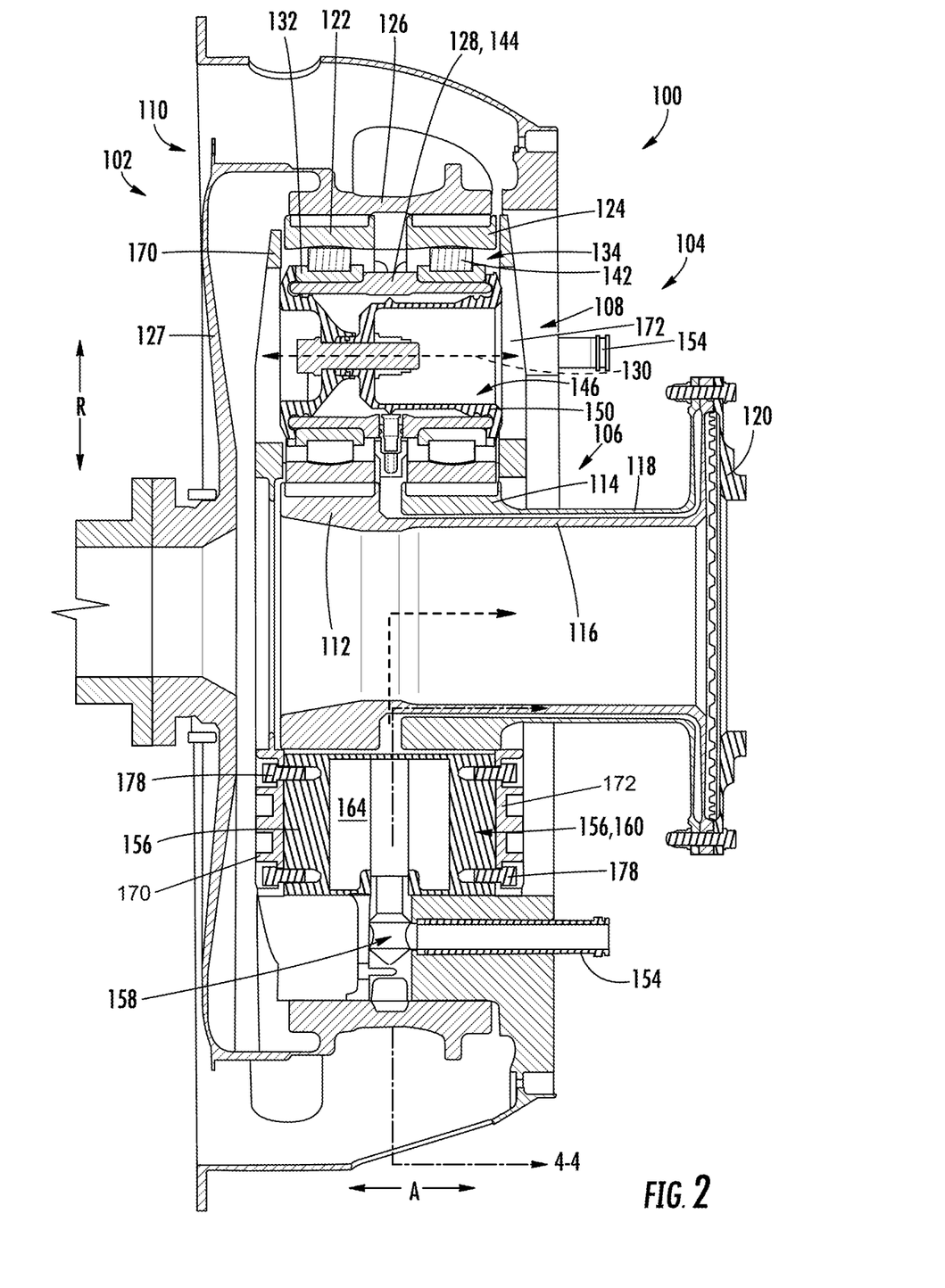
FIG. 2 is a cross-sectional view of a gearbox in accordance with an exemplary embodiment of the present disclosure.

Referring now to FIG. 2, a close-up, cross-sectional view is provided of an epicyclic gearbox 100 in accordance with an exemplary embodiment of the present disclosure. The epicyclic gearbox 100 generally defines an axial direction A, a radial direction R, and a circumferential direction C (see FIG. 4), as well as a forward side 102 and an aft side 104. In at least certain exemplary embodiments, the power gearbox 46 described above with reference to FIG. 1 may be configured in substantially the same manner as exemplary epicyclic gearbox 100 depicted in FIG. 2, and described below. Accordingly, in such an exemplary embodiment, the axial, radial, and circumferential directions A, R, C of the epicyclic gearbox 100 may correspond with an axial direction A, radial direction R, and circumferential direction of the gas turbine engine within which it is installed (see, e.g., FIG. 1).

As is depicted, the epicyclic gearbox 100 generally includes a sun gear assembly 106, a planet gear assembly 108, and a ring gear assembly 110. The sun gear assembly 106 generally includes a forward sun gear 112 and an aft sun gear 114 spaced along the axial direction A. The forward sun gear 112 is coupled to a forward sun gear shaft 116 and the aft sun gear 114 is similarly coupled to and aft sun gear shaft 118. The forward sun gear shaft 116 and aft sun gear shaft 118 are together coupled to an input shaft 120, which may be, e.g., a low pressure shaft (e.g., LP shaft 36, see FIG. 1) of the gas turbine engine including the epicyclic gearbox 100.

The planet gear assembly 108 similarly includes a forward planet gear 122 and an aft planet gear 124 spaced along the axial direction A. The forward planet gear 122 and aft planet gear 124 are each engaged with the sun gear assembly 106. More specifically, for the embodiment depicted, the forward planet gear 122 is engaged with the forward sun gear 112 and the aft planet gear 124 is engaged with the aft sun gear 114. Notably, as will be discussed in greater detail below, the forward planet gear 122 labeled in FIG. 2 is a first forward planet gear 122A of a plurality of forward planet gears 122 and the aft planet gear 124 labeled in FIG. 2 is a first aft planet gear 124A of a plurality of aft planet gears 124. (More particularly, as will be depicted in, e.g., FIG. 6, described below, for the embodiment shown, the plurality of forward planet gears 122 includes five forward planet gears 122, and the plurality of aft planet gears 124 includes five aft planet gears 124. However, in other embodiments, the plurality of forward planet gears 122 and plurality of aft planet gears 124 may instead have any other suitable number of planet gears.)

Further, it will be appreciated, that as used herein, the term "engaged," with respect to two or more gears, refers to, e.g., one or more teeth of such gears engaging with one another such that the two gears rotate with each other. Accordingly, although one or more gears may be represented in the Figs. as smooth circles for clarity, it will be appreciated that such gears actually include a plurality of teeth arranged along their circumference for engaging with an adjacent gear(s).

Referring still to FIG. 2, in contrast to the sun gear assembly 106 and planet gear assembly 108, the ring gear assembly 110 includes a single ring gear 126. The ring gear 126 is engaged with the planet gear assembly 108, and more specifically, is engaged with both the forward planet gear 122 and the aft planet gear 124. The ring gear 126 is coupled to a ring gear shaft 127. The ring gear shaft 127 is, in turn, coupled to an output shaft, which may be, e.g., a fan shaft of the gas turbine engine including the epicyclic gearbox 100 (e.g., fan shaft 45; see FIG. 1).

Accordingly, given the separate forward and aft planet gears 122, 124 and forward and aft sun gears 112, 114, the epicyclic gearbox 100 may generally be referred to as a "split sun" epicyclic gearbox. It will be appreciated, however, that in other embodiments, the sun gear assembly 106 may instead include, e.g., a single sun gear, and/or the ring gear assembly 110 may include separate forward and aft ring gears.

Figure 3:
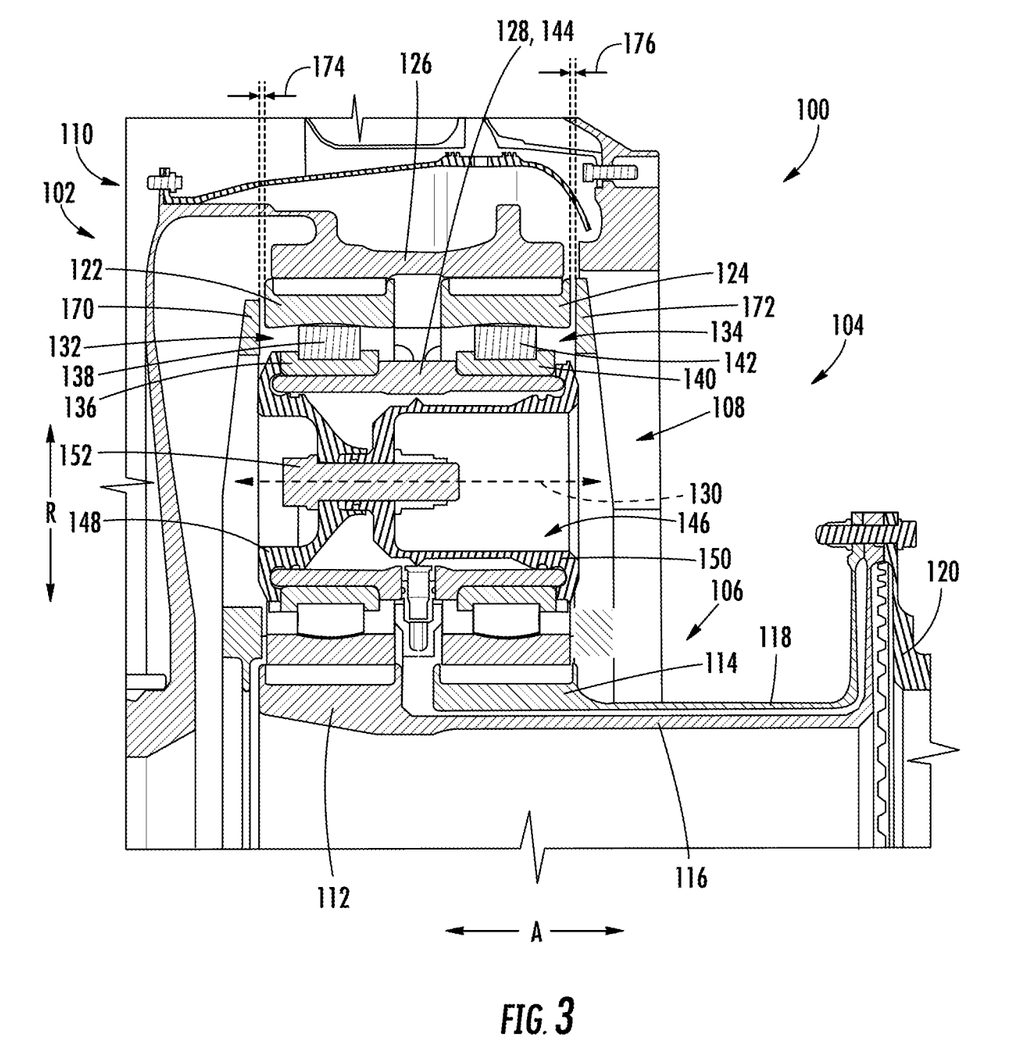
FIG. 3 is a close-up, cross-sectional view of a portion of the exemplary gearbox of FIG. 2.

Referring now also to FIG. 3, a close-up view of the forward planet gear 122 and aft planet gear 124 of the planet gear assembly 108 of FIG. 2 is provided. As will be appreciated, and as will be shown more clearly below, the epicyclic gearbox 100 further includes a planet gear carrier 128. Each of the planet gears 122, 124 of the planet gear assembly 108 are rotatably coupled to the planet gear carrier 128. Accordingly, the planet gear carrier 128 allows each of the planet gears 122, 124 of the planet gear assembly 108 to rotate about its respective local axis 130, while maintaining the planet gears 122, 124 stationary in the circumferential direction C of the epicyclic gearbox 100. Accordingly, it will be appreciated that the gearbox 100 may be referred to as a star gearbox. However, in other embodiments, one of the ring gear assembly 110 or sun gear assembly 106 may instead be held stationary, such that the gearbox 100 is instead configured as/referred to as a planetary gearbox or a differential gearbox, respectively.

Referring still to FIG. 3, in order to allow for the above configuration, the epicyclic gearbox 100 further includes bearings. For example, in the embodiment shown, the epicyclic gearbox 100 includes a forward bearing 132 for the forward planet gear 122 and an aft bearing 134 for the aft planet gear 124. The forward bearing 132 generally includes an inner race 136 containing a plurality of rollers 138. The plurality of rollers 138 of the forward bearing 132 are configured to interface between the forward planet gear 122 and the inner race 136, allowing for relative rotational movement therebetween (i.e., about the local axis 130). Similarly, the aft bearing 134 includes an inner race 140 containing a plurality of rollers 142. The plurality of rollers 142 of the aft bearing 134 are configured to interface between the aft planet gear 124 and the inner race 140, similarly allowing for relative rotational movement therebetween (i.e., about the local axis 130). The inner races 136, 140 of the forward bearing 132 and aft bearing 134, respectively, are positioned on a planet gear member 144 (or planet pin) of the planet gear carrier 128, and more specifically, are press fit on the planet gear member 144, and retained along the axial direction A through a clamp assembly 146. The clamp assembly 146 generally includes a forward clamp 148 and an aft clamp 150 coupled together using a tie bolt 152.

In such a manner, the forward planet gear 122 and aft planet gear 124 may rotate relative to the planet gear carrier 128 about their local axes 130, while maintaining a stationary position about the circumferential direction C of the epicyclic gearbox 100. (It should be appreciated, however, as stated above, the gearbox 100 may instead be configured as a planetary or differential gearbox, in which the planet gears 122, 124 may rotate about the circumferential direction C of the epicyclic gearbox 100.)

Referring now back to FIG. 2, it will be appreciated that the epicyclic gearbox 100 further includes a lubrication system for providing lubrication fluid to various components of the epicyclic gearbox 100. For example, the lubrication system is configured to provide lubrication fluid to the bearings 132, 134 and planet gears 122, 124 of the planet gear assembly 108 of the epicyclic gearbox 100.

For the embodiment depicted, the lubrication system generally includes one or more lubrication tubes 154 fluidly connected to a lubrication fluid source (not shown). The lubrication tubes 154 are configured to provide lubrication fluid to a lubrication spray ring 156 through, e.g., a radial pin 158 for the embodiment shown.

Figure 4:
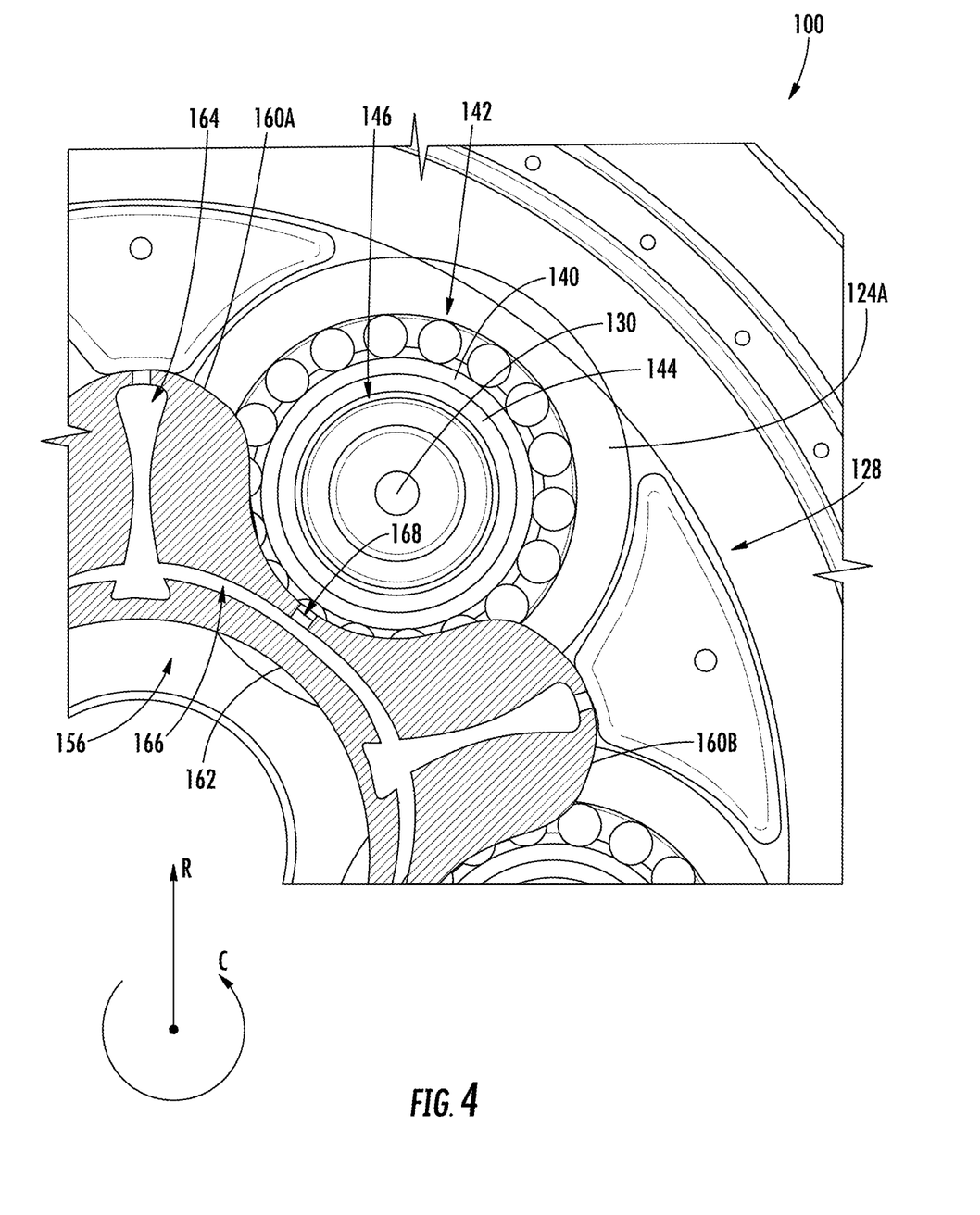
FIG. 4 is a cross-sectional view of a section of the exemplary gearbox of FIG. 2, taken along Line 4-4 in FIG. 2.
Figure 5:
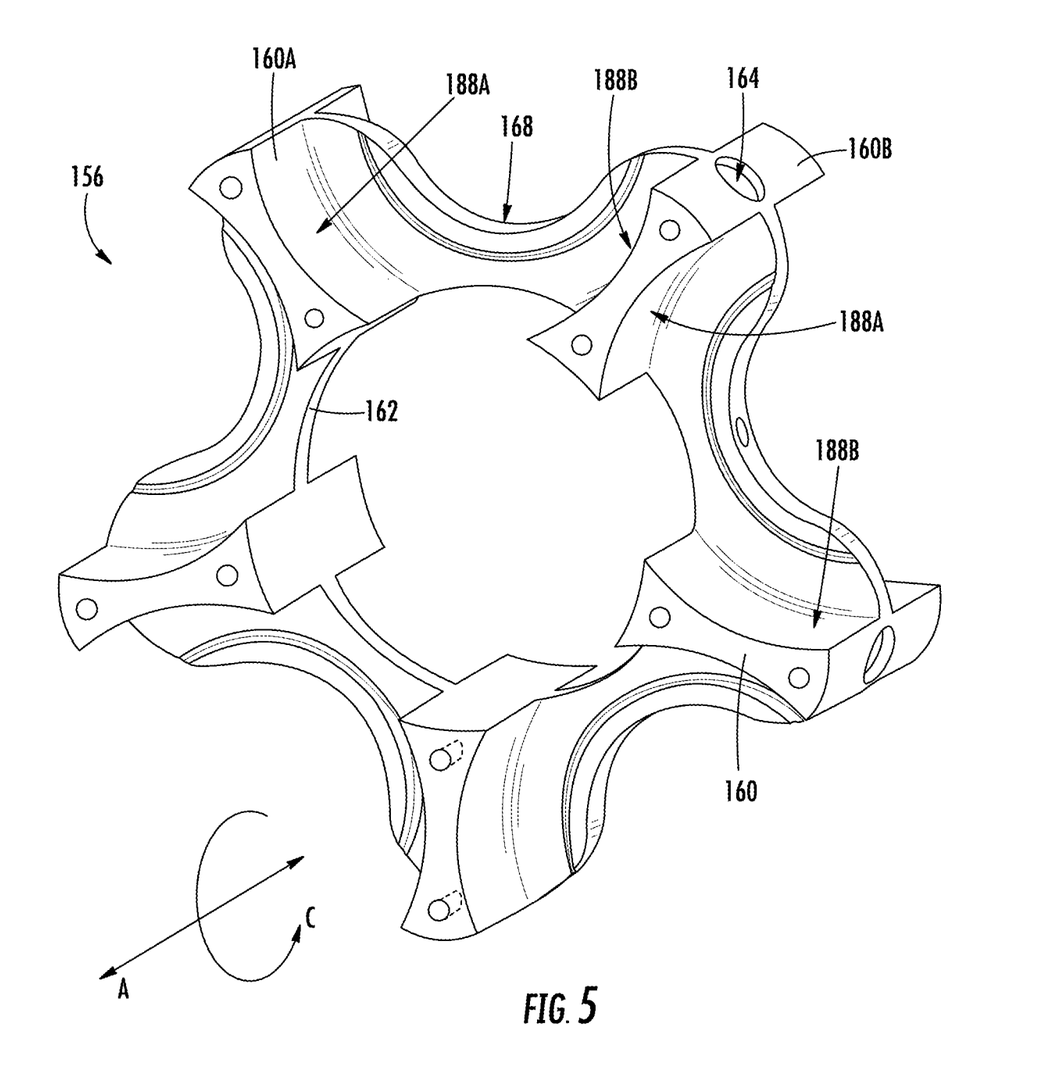
FIG. 5 is a perspective view of a lubrication spray ring in accordance with an exemplary embodiment of the present disclosure as may be incorporated into the gearbox of FIG. 2.

Referring now also to FIGS. 4 and 5, the lubrication system of the epicyclic gearbox 100 will be described in greater detail. FIG. 4 provides a close-up, cross-sectional view of the aft ring gear 126 and a portion of the lubrication spray ring 156 of FIG. 2, along Line 4-4 in FIG. 2. Additionally, FIG. 5 provides a perspective, isolated view of the lubrication spray ring 156.

As is shown, the lubrication spray ring 156 includes a plurality of lubrication spray bars 160 spaced along the circumferential direction C of the epicyclic gearbox 100. For example, the plurality of lubrication spray bars 160 includes a first lubrication spray bar 160A and a second lubrication spray bar 160B. The lubrication spray ring 156 further includes a body portion 162 extending along the circumferential direction C between each pair of adjacent lubrication spray bars 160, including between the first lubrication spray bar 160A and the second lubrication spray bar 160B. As is shown, and as will be appreciated, the first lubrication spray bar 160A and second lubrication spray bar 160B are each positioned adjacent to the first forward planet gear 122A (not depicted in FIG. 4) and at the first aft planet gear 124A of the planet gear assembly 108. Each of the lubrication spray bars 160 defines a main internal cavity 164 configured to receive lubrication fluid (e.g., through the lubrication tubes 154). The body portion 162 of the lubrication spray ring 156 defines lubrication fluid passages 166 extending between adjacent lubrication spray bars 160, and fluidly connected to the internal cavities 164 of the adjacent lubrication spray bars 160. The lubrication fluid passages 166 of the body portions 162 of the lubrication spray ring 156 each include an outlet nozzle 168 for providing lubrication fluid to, e.g., the bearings 132, 134 and ring gears 122, 124, as well as to adjacent internal cavities 164.

It will be appreciated that for the embodiment shown, the lubrication spray ring 156 is configured as a single, continuous ring. However, in other embodiments, the lubrication spray ring 156 may instead be formed of two or more separate components joined in any suitable manner. Additionally, in other exemplary embodiments, the lubrication spray ring 156 may have any other suitable configuration for providing lubrication fluid to the various components of the epicyclic gearbox 100.

Figure 6:
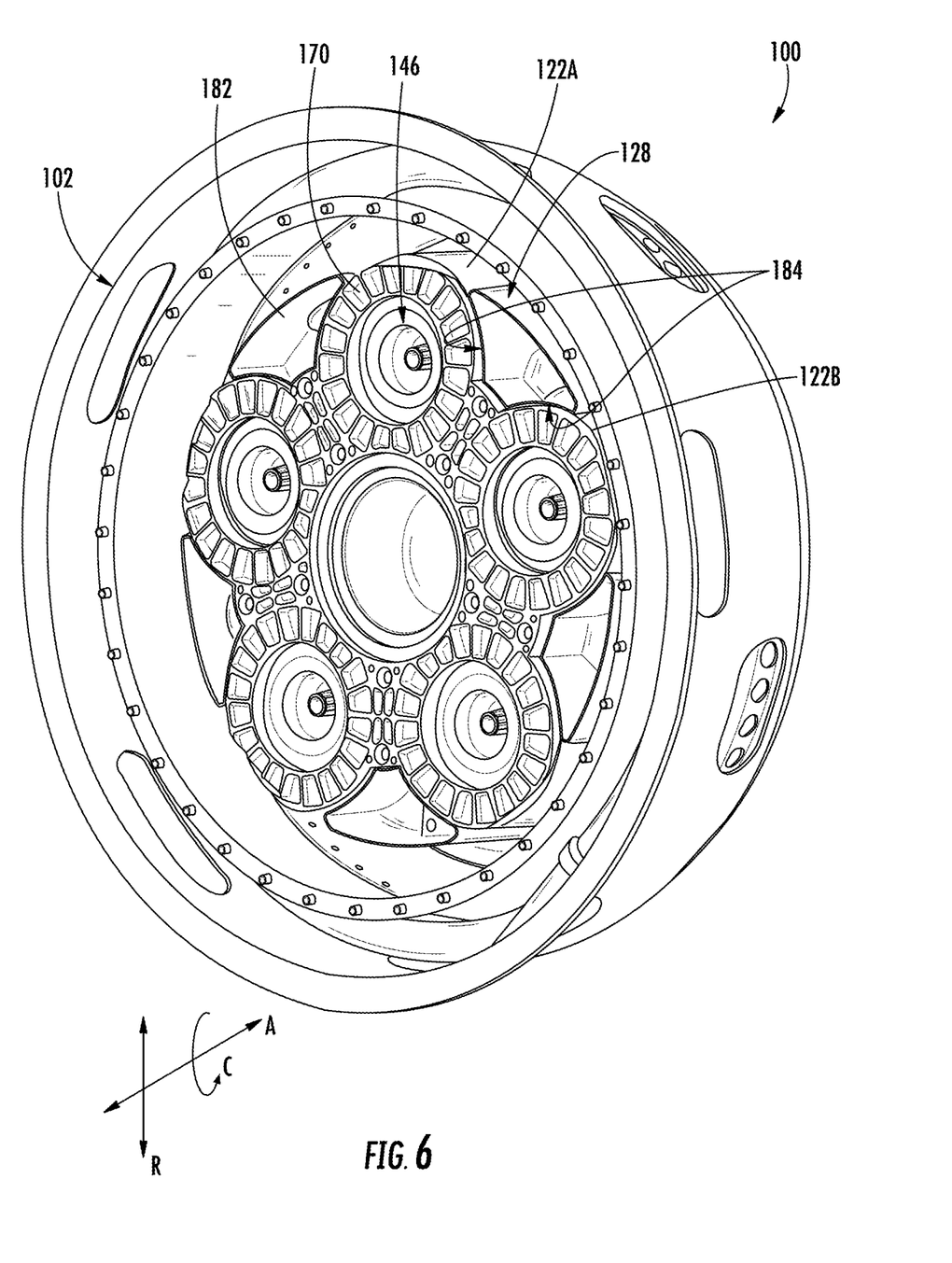
FIG. 6 is a forward perspective view of the exemplary gearbox of FIG. 2, with one or more components removed for clarity.
Figure 7:
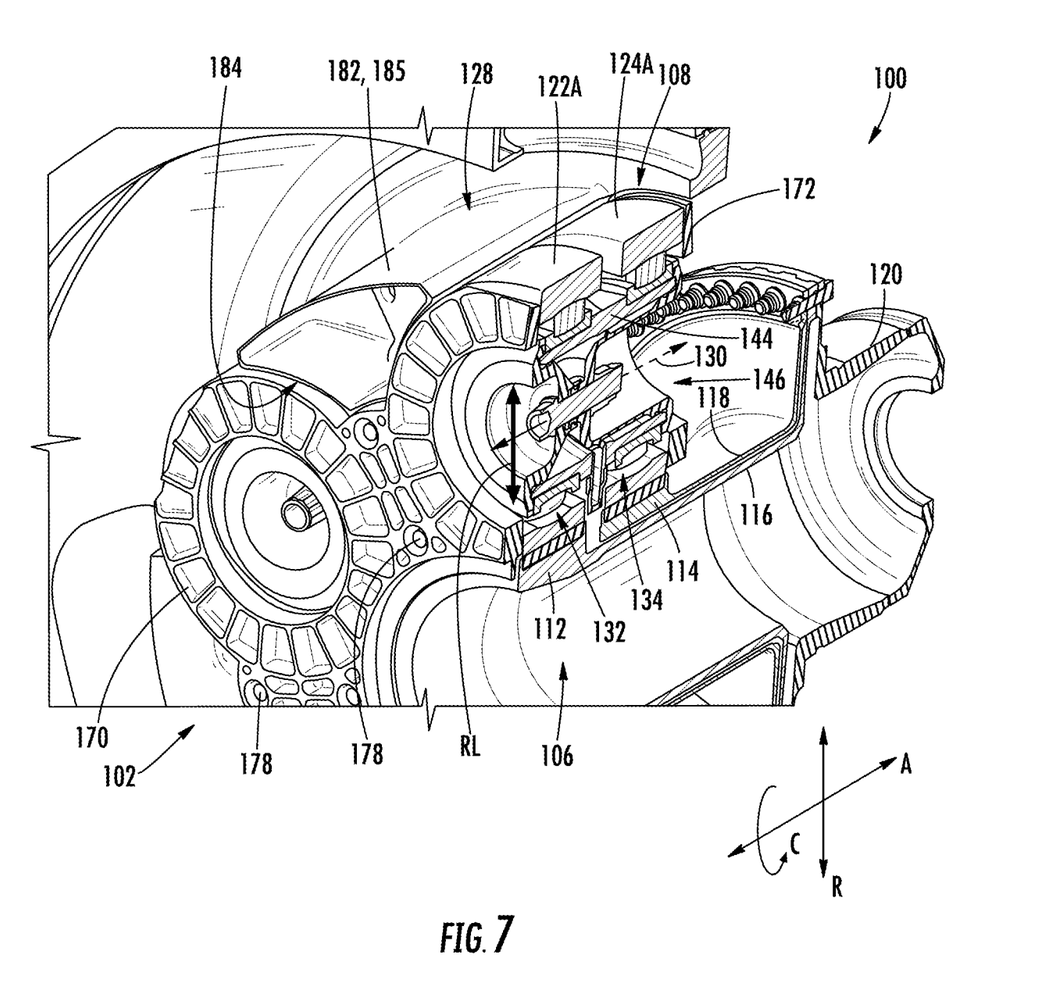
FIG. 7 is a perspective forward view and cross-sectional view of a portion of the exemplary gearbox of FIG. 2, with one or more components removed for clarity.
Figure 8:
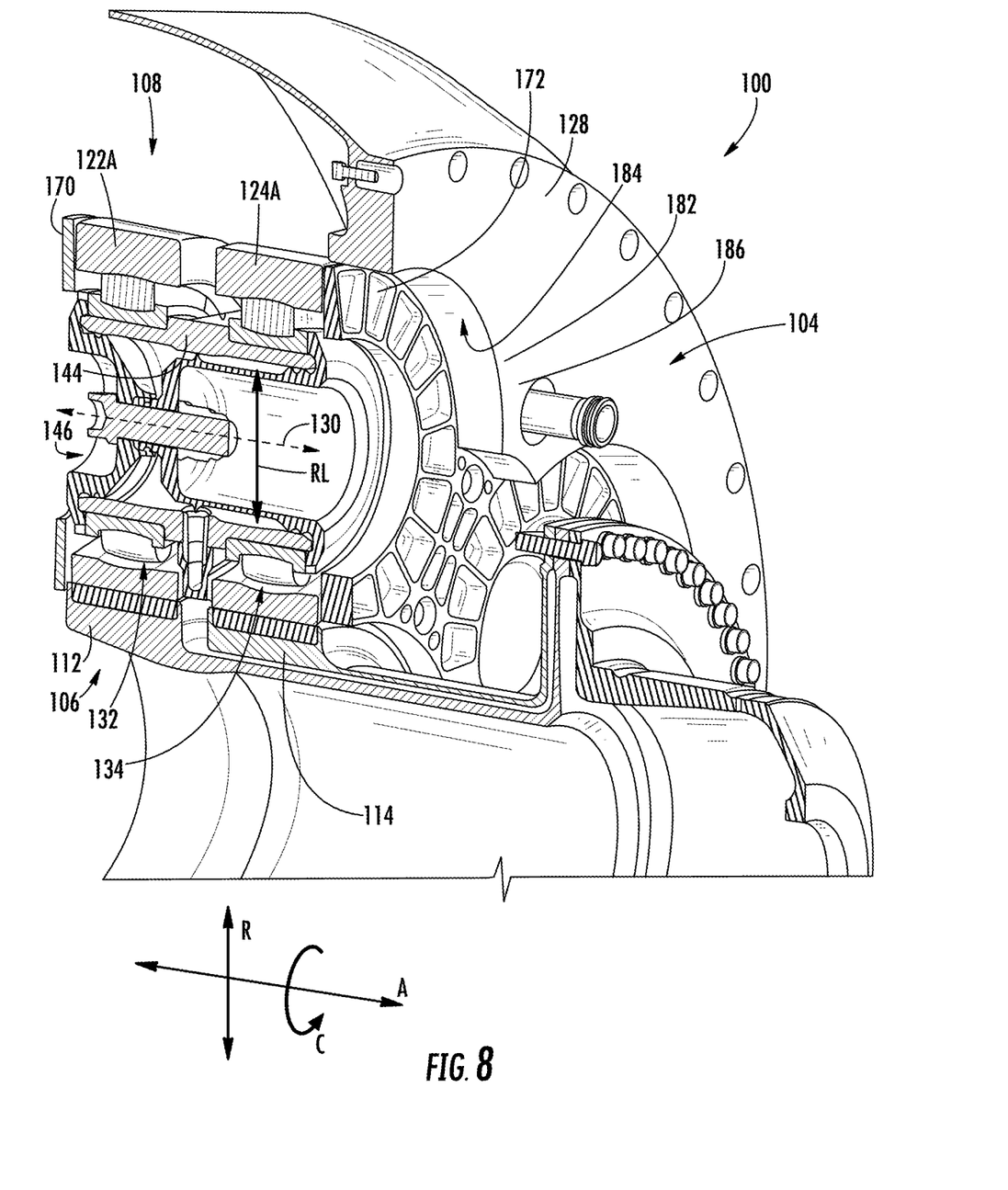
FIG. 8 is a perspective aft view and cross-sectional view of a portion of the exemplary gearbox of FIG. 2, with one or more components removed for clarity.

Referring now to FIGS. 6 through 8, additional features of the epicyclic gearbox 100 will be described. FIG. 6 provides a perspective view of the forward side 102 of the epicyclic gearbox 100 of FIG. 2, with the ring gear assembly 110 removed for clarity. FIG. 7 provides a close-up, perspective and cross-sectional view of the forward side 102 of the epicyclic gearbox 100 of FIG. 2, also with the ring gear assembly 110 removed for clarity. FIG. 8 provides a close-up, perspective and cross-sectional view of the aft side 104 of the epicyclic gearbox 100 of FIG. 2, also with the ring gear assembly 110 removed for clarity.

It will be appreciated from these Figs. and the discussion herein that the exemplary epicyclic gearbox 100 described herein includes one or more features for containing lubrication fluid provided to the epicyclic gearbox 100 through the lubrication system. More specifically, for the embodiment depicted, the epicyclic gearbox 100 further includes a first axial shroud positioned forward of the forward planet gear 122 or aft of the aft planet gear 124 along the axial direction A. The first axial shroud covers substantially all of a forward side of the forward planet gear 122 or an aft side of the aft planet gear 124 to contain the lubrication fluid motion within or around the planet gear assembly 108.

More specifically, for the embodiment depicted, the first axial shroud is a forward axial shroud 170 positioned forward of the forward planet gear 122 along the axial direction A (see, particularly, FIGS. 6 and 7). Additionally, the epicyclic gearbox 100 of the embodiment shown further includes a second axial shroud, or more specifically, still, a second, aft axial shroud 172 positioned aft of the aft planet gear 124 along the axial direction A (see, particularly, FIG. 8). The forward axial shroud 170 covers substantially all of a forward side of the forward planet gear 122 and the aft axial shroud 172 covers substantially all of an aft side of the aft planet gear 124. Further, the forward axial shroud 170 covers substantially all of the forward bearing 132 and the aft axial shroud 172 covers substantially all of the aft bearing 134. In certain embodiments, the aft axial shroud 172 may be configured in substantially the same manner as the forward axial shroud 170 (with, e.g., some minor distinctions allowing for ease of installation). Additionally, it will be appreciated that for the embodiments shown, the portions of forward axial shroud 170 and aft axial shroud 172 covering the forward planet gear 122 and aft planet gear 124, respectively, as well as the forward bearing 132 and aft bearing 134, respectively, extend substantially along the radial direction of the epicyclic gearbox 100. Additionally, as used herein, the term "covers" with reference to the forward and aft axial shrouds 170, 172 refers to the component overlapping the other component when viewed along the axial direction A of the epicyclic gearbox 100.

It will further be appreciated that the forward axial shroud 170 is positioned relatively close to the forward side of the forward planet gear 122 and the aft axial shroud 172 is positioned relatively close to the aft side of the aft planet gear 124. More specifically, referring back briefly to FIG. 3, for the embodiment shown the forward axial shroud 170 defines an axial separation 174 from the forward planet gear 122 (i.e., a separation between the two components along the axial direction A) that is less than about 0.5 inches, and the aft axial shroud 172 defines an axial separation 176 from the aft planet gear 124 also less than about 0.5 inches. Notably, however, in other embodiments, the axial separations 174, 176 may instead be, e.g., less than about 0.7 inches, such as less than about 0.4 inches, such as less than about 0.25 inches, such as less than about 0.15 inches.

It will further be appreciated that for the embodiment depicted the forward axial shroud 170 is further positioned forward of each of the plurality of forward planet gears 122 along the axial direction A and substantially covers the forward sides of each of the plurality of forward planet gears 122, as well as each of their respective forward bearings 132. Similarly, for the embodiment depicted the aft axial shroud 172 is positioned aft of each of the plurality of aft planet gears 124 along the axial direction A and substantially covers the aft sides of each of the plurality of aft planet gears 124, as well as each of their respective bearings 134 (not shown).

Furthermore, it will be appreciated that the forward axial shroud 170 is coupled to the aft axial shroud 172. More specifically, the forward axial shroud 170 is coupled to the aft axial shroud 172 at a location between adjacent planet gears, such as between adjacent forward planet gears 122 and between adjacent aft planet gears 124, along the circumferential direction C. More specifically, still, the forward axial shroud 170 is coupled to the aft axial shroud 172 through the plurality of lubrication spray bars 160 of the lubrication spray ring 156 (see, e.g., FIG. 2 showing bolts 178 coupling the depicted forward axial shroud 170 to the depicted lubrication spray bar 160 of the lubrication spray ring 156, and also coupling the aft axial shroud 172 to the depicted lubrication spray bar 160 of the lubrication spray ring 156).

Inclusion of the forward axial shroud 170 and aft axial shroud 172 may assist with containing the lubrication fluid motion along the axial direction A of the epicyclic gearbox 100, such that the lubrication fluid provided to, e.g., the bearings 134, 136 and/or the planet gears 122, 124 during operation generates lower windage losses and is maintained/contained close to the contacting surfaces of such components for a longer period of time, increasing an efficiency and lifespan of the epicyclic gearbox 100, especially in the case of an inadvertent oil flow interruption, e.g. in a "negative g" flight phase.

Figure 9:
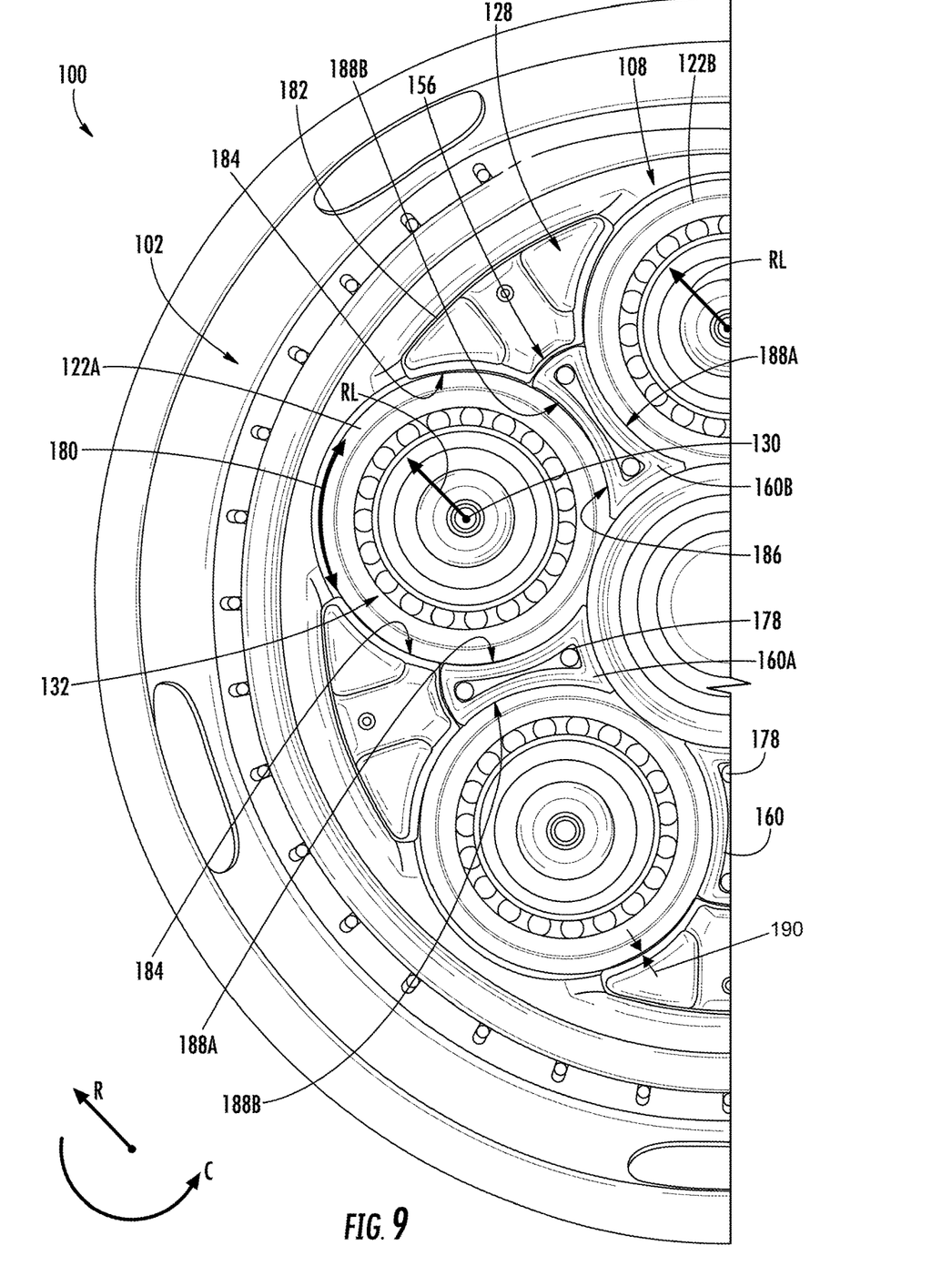
FIG. 9 is a forward, sectional view of the exemplary gearbox of FIG. 2, with one or more components removed for clarity.

Notably, referring still to FIGS. 6 through 8, and now also to FIG. 9, providing a sectional view of the forward side 102 of the epicyclic gearbox 100, with the forward axial shroud 170 and ring gear assembly 110 removed for clarity, it will be appreciated that the epicyclic gearbox 100 is also configured to constrain the flow of lubrication fluid along the radial direction R, or more specifically, along a local radial direction RL of each planet gear 122, 124. (The local radial direction RL is a radial direction of the respective planet gear, 122, 124 relative to the respective local axis 130.) More specifically, it will be appreciated that the forward planet gear 122 and the aft planet gear 124 each define an outer circumference 180 (see FIG. 9). The outer circumferences 180 of the forward planet gear 122 and of the aft planet gear 124 refer to a circumference of an imaginary reference circle intersecting the radially outermost points of the respective forward planet gear 122 and aft planet gear 124 (i.e., the tips of the teeth of the planet gears 122, 124—teeth not shown for clarity).

For example, the planet gear carrier 128 includes features extending along at least a portion of the outer circumference 180 of the forward planet gear 122 and along at least a portion of the outer circumference 180 of the aft planet gear 124. More specifically, the planet gear carrier 128 includes a radial shroud 182 having one or more shroud surfaces 184 extending along at least a portion of the outer circumference 180 of the forward planet gear 122 and along at least a portion of the outer circumference 180 of the aft planet gear 124 to contain lubrication fluid from the forward planet gear 122 and the aft planet gear 124 along the respective local radial direction RL. For the embodiment depicted, the radial shroud 182 is positioned between adjacent forward planet gears 122 and between adjacent aft planet gears 124. The radial shroud 182 includes a forward portion 185 extending along the outer circumferences 180 of two adjacent forward planet gears 122 (e.g., between the first forward planet gear 122A and a second forward planet gear 122B; see FIG. 6) and an aft portion 186 extending along the outer circumferences 180 of two adjacent aft planet gears 124 along the circumferential direction C (e.g., between the first aft planet gear 124A (see FIG. 8) and a second aft planet gear 124B (not shown)). In at least certain exemplary embodiments, the one or more shroud surfaces 184 of the radial shroud 182 extend along at least about twenty percent of the outer circumference 180 of the forward planet gear 122 and of the outer circumference 180 of the aft planet gear 124.

Moreover, referring particularly to FIG. 9, it will be appreciated that the lubrication spray ring 156 is also configured to assist with the constraining of lubrication fluid of each of the plurality of planet gears 122, 124 along their respective local radial directions RL. More specifically, it will be appreciated that each lubrication spray bar 160 includes a radial shroud surface 188, and more specifically includes multiple radial shroud surfaces 188. For example, in the embodiment of FIG. 9, a first lubrication spray bar 160A includes a first radial shroud surface 188A and a second radial shroud surface 188B, and similarly a second lubrication spray bar 160B also includes a first radial shroud surface 188A and a second radial shroud surface 188B. The one or more shroud surfaces 184 of the radial shroud 182 of the planet gear carrier 128, the first radial shroud surface 188A of the first spray bar 160A, and the second radial shroud surface 188B of the second spray bar 160B together extend a greater distance (relative to either of these components individually) along the outer circumference 180 of the forward planet gear 122 (not shown) and along the outer circumference 180 of the aft planet gear 124 (shown). For example, in certain embodiments, the one or more shroud surfaces 184 of the radial shroud 182 of the planet gear carrier 128 and the radial shroud surfaces 188A, 188B of the first and second spray bars 160A, 160B together extend along at least about seventy percent of the outer circumferences 180 of the forward planet gear 122 and of the aft planet gear 124, such as at least about eighty percent of the outer circumferences 180 of the forward planet gear 122 and of the aft planet gear 124.

Moreover, it will be appreciated that the one or more shroud surfaces 184 of the radial shroud 182 of the planet gear carrier 128 and the shroud surfaces 188 of the spray bars 160 each define relatively close clearances 190 to the outermost portions of the respective forward planet gear 122 and aft planet gear 124. For example, in certain embodiments, these surfaces 184, 188 define an average clearance 190 with the outermost portions of the respective forward planet gear 122 and aft planet gear 124 less than about 0.7 inches, such as less than about 0.5 inches, such as less than about 0.25 inches, such as less than about 0.15 inches.

Inclusion of the epicyclic gearbox in accordance with one or more of the embodiments described herein may provide for a more efficient epicyclic gearbox, and further may increase a lifespan of the respective epicyclic gearbox. Further, such an epicyclic gearbox may require less lubrication fluid, and may be less susceptible to a loss of lubrication condition (as lubrication fluid is contained/maintained in position for longer periods of time). Each of these benefits is enabled by the inclusion of the various shroud configurations designed to maintain lubrication in position longer, such that the lubrication fluid provided to, e.g., the bearings and/or the planet gears during operation is maintained close to the contacting surfaces of such components for a longer period of time.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims. For instance, features illustrated or described as part of one embodiment may be used on another embodiment to yield a still further embodiment.

While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation.

What is claimed is:

1. An epicyclic gearbox defining an axial direction, a radial direction, and a circumferential direction, the epicyclic gearbox comprising:
   a sun gear assembly;
   a planet gear assembly comprising a forward planet gear and an aft planet gear spaced along the axial direction, the forward planet gear and aft planet gear each engaged with the sun gear assembly, the forward planet gear defining an outer circumference and the aft planet gear defining an outer circumference;
   a ring gear assembly engaged with the forward planet gear and the aft planet gear;
   a first axial shroud positioned forward of the forward planet gear or aft of the aft planet gear along the axial direction, the first axial shroud covering substantially all of a forward side of the forward planet gear or an aft side of the aft planet gear to contain lubrication fluid within or around the planet gear assembly; and
   a planet gear carrier, the planet gear assembly coupled to the planet gear carrier, the planet gear carrier comprising a radial shroud including one or more radial shroud surfaces extending along at least a portion of the outer circumference of the forward planet gear and along at least a portion of the outer circumference of the aft planet gear to contain lubrication fluid within or around the planet gear assembly, the one or more radial shroud surfaces extending in the axial direction at least forward of the first axial shroud positioned forward of the forward planet gear or aft of the first axial shroud positioned aft of the aft planet gear.

2. The epicyclic gearbox of claim 1, wherein the sun gear assembly comprises a forward sun gear and an aft sun gear spaced along the axial direction, wherein the forward planet gear is engaged with the forward sun gear, and wherein the aft planet gear is engaged with the aft sun gear.

3. The epicyclic gearbox of claim 1, wherein the first axial shroud is a forward axial shroud positioned forward of the forward planet gear along the axial direction and covering substantially all of the forward side of the forward planet gear.

4. The epicyclic gearbox of claim 3, further comprising:
   a second, aft axial shroud positioned aft of the aft planet gear along the axial direction and covering substantially all of the aft side of the aft planet gear.

5. The epicyclic gearbox of claim 4, wherein the forward axial shroud is coupled to the aft axial shroud.

6. The epicyclic gearbox of claim 5, further comprising:
   a lubrication spray ring comprising a plurality of lubrication spray bars spaced along the circumferential direction, wherein the forward axial shroud is coupled to the aft axial shroud through the plurality of lubrication spray bars of the lubrication spray ring.

7. The epicyclic gearbox of claim 4, wherein the forward axial shroud defines an axial separation from the forward planet gear less than about 0.5 inches, and wherein the aft axial shroud defines an axial separation from the aft planet gear less than about 0.5 inches.

8. The epicyclic gearbox of claim 1, wherein the one or more radial shroud surfaces of the radial shroud extend along at least about 20 percent of the outer circumference of the forward planet gear and of the outer circumference of the aft planet gear.

9. The epicyclic gearbox of claim 1, further comprising:
   a lubrication spray ring comprising a plurality of lubrication spray bars spaced along the circumferential direction, wherein the plurality of lubrication spray bars includes a first lubrication spray bar and a second lubrication spray bar, wherein the first lubrication spray bar and the second lubrication spray bar are each positioned adjacent to the forward planet gear and the aft planet gear, wherein the first lubrication spray bar includes a radial shroud surface, wherein the second lubrication spray bar also includes a radial shroud surface, wherein the one or more radial shroud surfaces of the radial shroud of the planet gear carrier and the radial shroud surfaces of the first and second spray bars together extend along at least about seventy percent of the outer circumferences of the forward planet gear and of the aft planet gear.

10. The epicyclic gearbox of claim 9, wherein the one or more radial shroud surfaces of the radial shroud of the planet gear carrier and the radial shroud surfaces of the first and second spray bars together extend along at least about eighty percent of the outer circumferences of the forward planet gear and of the aft planet gear.

11. The epicyclic gearbox of claim 9, wherein the one or more radial shroud surfaces of the radial shroud of the planet gear carrier and the radial shroud surfaces of the first and second spray bars together define an average separation with the forward planet gear and the aft planet gear of less than about 0.7 inches.

12. The epicyclic gearbox of claim 1, wherein the forward planet gear is a first forward planet gear of a plurality of forward planet gears, wherein the aft planet gear is a first aft planet gear of a plurality of aft planet gears, wherein each of the plurality of forward planet gears is engaged with the sun gear assembly and the ring gear assembly, wherein each of the plurality of aft planet gears is also engaged with the sun gear assembly and the ring gear assembly, and wherein the first axial shroud is a forward axial shroud positioned forward of the plurality of forward planet gears along the axial direction, covering substantially all of a forward side of each of the plurality of forward planet gears.

13. The epicyclic gearbox of claim 12, further comprising:
a second, aft axial shroud positioned aft of the plurality of aft planet gears along the axial direction and covering substantially all of an aft side of each of the plurality of aft planet gears.

14. A gas turbine engine defining an axial direction, the gas turbine engine comprising:
a turbine section comprising a turbine;
a fan assembly comprising a fan; and
a epicyclic gearbox coupling the turbine of the turbine section to the fan of the fan assembly, the epicyclic gearbox comprising:
a sun gear assembly;
a planet gear assembly comprising a forward planet gear and an aft planet gear spaced along the axial direction, the forward planet gear and aft planet gear each engaged with the sun gear assembly, the forward planet gear defining an outer circumference and the aft planet gear defining an outer circumference;
a ring gear assembly engaged with the forward planet gear and the aft planet gear;
a first axial shroud positioned forward of the forward planet gear or aft of the aft planet gear along the axial direction, the first axial shroud covering substantially all of a forward side of the forward planet gear or an aft side of the aft planet gear to contain lubrication fluid within or around the planet gear assembly; and
a planet gear carrier, the planet gear assembly coupled to the planet gear carrier, the planet gear carrier comprising a radial shroud including one or more radial shroud surfaces extending along at least a portion of the outer circumference of the forward planet gear and along at least a portion of the outer circumference of the aft planet gear to contain lubrication fluid within or around the planet gear assembly, the one or more radial shroud surfaces extending in the axial direction at least forward of the first axial shroud positioned forward of the forward planet gear or aft of the first axial shroud positioned aft of the aft planet gear.

15. The gas turbine engine of claim 14, wherein the sun gear assembly comprises a forward sun gear and an aft sun gear spaced along the axial direction, wherein the forward planet gear is engaged with the forward sun gear, and wherein the aft planet gear is engaged with the aft sun gear.

16. The gas turbine engine of claim 14, wherein the first axial shroud is a forward axial shroud positioned forward of the forward planet gear along the axial direction and covering substantially all of the forward side of the forward planet gear.

17. The gas turbine engine of claim 16, wherein the epicyclic gearbox further comprises a second, aft axial shroud positioned aft of the aft planet gear along the axial direction and covering substantially all of the aft side of the aft planet gear.

18. The gas turbine engine of claim 17, wherein the forward axial shroud defines an axial separation from the forward planet gear less than about 0.5 inches, and wherein the aft axial shroud defines an axial separation from the aft planet gear less than about 0.5 inches.

19. The gas turbine engine of claim 14, wherein the one or more radial shroud surfaces of the radial shroud extend along at least about 20 percent of the outer circumference of the forward planet gear and of the outer circumference of the aft planet gear.

20. The gas turbine engine of claim 14, wherein the epicyclic gearbox further comprises a lubrication spray ring comprising a plurality of lubrication spray bars spaced along the circumferential direction, wherein the plurality of lubrication spray bars includes a first lubrication spray bar and a second lubrication spray bar, wherein the first lubrication spray bar and the second lubrication spray bar are each positioned adjacent to the forward planet gear and the aft planet gear, wherein the first lubrication spray bar includes a radial shroud surface, wherein the second lubrication spray bar also includes a radial shroud surface, wherein the one or more radial shroud surfaces of the radial shroud of the planet gear carrier and the radial shroud surfaces of the first and second spray bars together extend along at least about seventy percent of the outer circumferences of the forward planet gear and of the aft planet gear.

\* \* \* \* \*